(12) United States Patent
Sen et al.

(10) Patent No.: US 10,416,772 B2
(45) Date of Patent: Sep. 17, 2019

(54) ELECTRICAL HAPTIC OUTPUT ARRAY

(71) Applicant: Apple Inc., Cupertino, CA (US)

(72) Inventors: Yi-Heng Sen, San Jose, CA (US); Travis N. Owens, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/696,876

(22) Filed: Sep. 6, 2017

(65) Prior Publication Data

US 2019/0073033 A1   Mar. 7, 2019

(51) Int. Cl.
| | |
|---|---|
| *G06F 3/01* | (2006.01) |
| *G06F 3/044* | (2006.01) |
| *G06F 3/041* | (2006.01) |

(52) U.S. Cl.
CPC .............. *G06F 3/016* (2013.01); *G06F 3/041* (2013.01); *G06F 3/044* (2013.01)

(58) Field of Classification Search
CPC ......... G06F 3/0412; G06F 3/044; G06F 3/016
See application file for complete search history.

(56) References Cited

U.S. PATENT DOCUMENTS

| | | | |
|---|---|---|---|
| 5,060,527 A | 10/1991 | Burgess | |
| 6,963,762 B2 | 11/2005 | Kaaresoja et al. | |
| 8,314,775 B2 | 11/2012 | Westerman | |
| 8,441,465 B2 | 5/2013 | Radivojevic | |
| 8,466,366 B2 | 6/2013 | Srinivas | |
| 9,063,572 B2 | 6/2015 | Makinen et al. | |
| 9,098,113 B2 | 8/2015 | Brokken | |
| 9,122,330 B2 | 9/2015 | Olivier et al. | |
| 9,231,186 B2 | 1/2016 | Busgen | |
| 9,600,070 B2 | 3/2017 | Chatterjee et al. | |
| 9,612,674 B2 | 4/2017 | Degner et al. | |
| 9,634,225 B2 | 4/2017 | Hubert et al. | |
| 9,733,746 B2 | 8/2017 | Colgate et al. | |
| 9,746,964 B2 | 8/2017 | Rosenberg | |
| 9,829,979 B2 | 11/2017 | Brombach et al. | |
| 9,875,625 B2 | 1/2018 | Khoshkava et al. | |
| 9,880,623 B2 | 1/2018 | Lacroix et al. | |
| 9,927,887 B2 | 3/2018 | Bulea | |
| 9,939,900 B2 | 4/2018 | Cruz-Hernandez et al. | |

(Continued)

FOREIGN PATENT DOCUMENTS

EP   2000885   12/2008

OTHER PUBLICATIONS

U.S. Appl. No. 15/717,714, filed Sep. 27, 2017, Wen et al.

(Continued)

*Primary Examiner* — David Tung
(74) *Attorney, Agent, or Firm* — Brownstein Hyatt Farber Schreck, LLP

(57) ABSTRACT

An electronic device that is operable to provide electrical haptic output includes a touch surface and multiple haptic cells disposed on the touch surface. The multiple haptic cells include capacitors that are operable to store charges independently of each other and independently provide haptic output when touched by a body by discharging the stored charge to create a current. In this way, a wide variety of dynamically configurable haptic outputs can be provided without moving parts and without consuming the space and/or power used for haptic actuators that vibrate and/or otherwise move a mass.

20 Claims, 7 Drawing Sheets

(56) References Cited

U.S. PATENT DOCUMENTS

| | | |
|---|---|---|
| 9,965,037 B2 | 5/2018 | Hong et al. |
| 10,000,622 B2 | 6/2018 | Kumano et al. |
| 10,038,154 B2 | 7/2018 | Lee |
| 10,061,448 B2 | 8/2018 | Baek |
| 10,120,447 B2 | 11/2018 | Peshkin et al. |
| 10,147,868 B2 | 12/2018 | Ozawa |
| 10,208,158 B2 | 2/2019 | Banister et al. |
| 10,257,929 B2 | 4/2019 | Lim |
| 2008/0303795 A1 | 12/2008 | Lowles et al. |
| 2010/0097323 A1 | 4/2010 | Edwards et al. |
| 2011/0109588 A1* | 5/2011 | Makinen ............... G09B 21/003 345/174 |
| 2011/0286156 A1* | 11/2011 | Beecher ............... B06B 1/0292 361/679.01 |
| 2012/0112894 A1 | 5/2012 | Yang et al. |
| 2012/0126959 A1 | 5/2012 | Zarrabi et al. |
| 2012/0268412 A1* | 10/2012 | Cruz-Hernandez ......................... G06F 3/0488 345/174 |
| 2012/0306790 A1 | 12/2012 | Kyung et al. |
| 2013/0277625 A1 | 10/2013 | Srinivas et al. |
| 2014/0192005 A1* | 7/2014 | Wakuda ............... G06F 3/041 345/173 |
| 2015/0155470 A1* | 6/2015 | Mori ................... G06F 3/016 310/326 |
| 2015/0169118 A1 | 6/2015 | Lee et al. |
| 2016/0124548 A1 | 5/2016 | Cherif et al. |
| 2016/0209958 A1 | 7/2016 | Choi et al. |
| 2016/0357342 A1 | 12/2016 | Olley et al. |
| 2016/0370862 A1 | 12/2016 | Colgate et al. |
| 2017/0038904 A1* | 2/2017 | Murata ................ G06F 3/0421 |
| 2017/0060239 A1 | 3/2017 | Lim et al. |
| 2017/0168572 A1* | 6/2017 | Peshkin ............... G06F 3/016 |
| 2017/0239130 A1 | 8/2017 | Rizzo |
| 2017/0308171 A1 | 10/2017 | Kamata et al. |
| 2017/0364158 A1 | 12/2017 | Wen et al. |
| 2017/0364184 A1 | 12/2017 | Weinerth et al. |
| 2017/0371490 A1 | 12/2017 | Sugimoto et al. |
| 2018/0081441 A1 | 3/2018 | Pedder et al. |
| 2018/0095581 A1 | 4/2018 | Hwang et al. |
| 2018/0113512 A1 | 4/2018 | Kang et al. |
| 2018/0151281 A1 | 5/2018 | Khoshkava et al. |
| 2018/0181202 A1 | 6/2018 | Khoshkava et al. |
| 2018/0269807 A1 | 9/2018 | Khoshkava |
| 2018/0312392 A1 | 11/2018 | Buchanan et al. |
| 2018/0335659 A1 | 11/2018 | Takeda et al. |

OTHER PUBLICATIONS

U.S. Appl. No. 15/717,682, filed Sep. 27, 2017, Wen et al.

U.S. Appl. No. 15/719,326, filed Sep. 28, 2017, Van Ausdall et al.

\* cited by examiner

ELECTRICAL HAPTIC OUTPUT ARRAY

FIELD

The described embodiments relate generally to haptics. More particularly, the present embodiments relate to haptic output using electrical current provided from a haptic output device to a user uni-directionally.

BACKGROUND

Electronic devices may be operable to receive a variety of different kinds of input from users and provide a variety of different kinds of output. Examples of input include key input received via a keyboard, mouse input received via a computer mouse, voice input received via a microphone, button input received via a button, touch input received via a touch display or other touch surface, and so on. Examples of output include visual output provided via a display, audio output provided via a speaker, and so on.

Some electronic devices are operable to provide output by vibrating and/or otherwise moving a mass. These vibrations may be transferred through a housing where they can be felt tactilely by a user.

SUMMARY

The present disclosure relates to an electronic device that is operable to provide electrical haptic output. The electronic device includes a touch surface and multiple haptic cells disposed on the touch surface. The multiple haptic cells include capacitors that are operable to store charges independently of each other and independently provide haptic output when touched by a body by discharging the stored charge to create a current. In this way, a wide variety of dynamically configurable haptic outputs can be provided without moving parts and without consuming the space and/or power used for haptic actuators that vibrate and/or otherwise move a mass.

In some embodiments, a haptic output device includes a cover layer having an exterior surface and an interior surface, a display layer coupled to the interior surface, a touch sensing layer coupled to the display layer, multiple capacitors that each include a transparent electrode disposed on the exterior surface, and control circuitry coupled to the multiple capacitors operable to independently charge each of the multiple capacitors. Touch of a body to the transparent electrode of a respective capacitor of one of the multiple capacitors provides a haptic output by discharging the respective capacitor to create a current.

In various implementations, the transparent electrode comprises indium tin oxide. In some implementations, the haptic output device further includes transparent conductive wires disposed on or under the cover layer and that connect each of the multiple capacitors to the control circuitry.

In various implementations, the haptic output device further includes multiple resistors that each connect the control circuitry to one of the multiple capacitors. In some implementations, the haptic output device further includes multiple amplifiers that each connect the control circuitry to one of the multiple capacitors.

In numerous implementations, the haptic output device further includes a frame. The frame forms a portion of the exterior of the haptic output device and functions as a ground for each of the multiple capacitors. In some implementations, the control circuitry is operable to charge at least one of the multiple capacitors based on a detected touch determined by the touch sensing layer.

In various embodiments, a haptic output device includes a touch surface, multiple haptic cells disposed on the touch surface, and switching circuitry coupled to the multiple haptic cells and a voltage source operable to independently store charges at each of the multiple haptic cells. Each of the multiple haptic cells are operable to provide a haptic output when touched by a body, by discharging the stored charge to create a current.

In some implementations, the multiple haptic cells discharge the charge into the body. In numerous implementations, the haptic output device further includes anisotropic conductive film disposed on the touch surface that connects the switching circuitry to the multiple haptic cells.

In various implementations, each of the multiple haptic cells are operable to have a different voltage level from each other. In some implementations, the touch surface is an opaque housing of the haptic output device. In numerous implementations, the current simulates a rougher texture than the touch surface when the body moves across the touch surface. In some implementations, a ground connected to the multiple haptic cells and the body have a same potential.

In numerous embodiments, a haptic output device includes a touch surface having an exterior surface and an interior surface, multiple electrodes disposed on the exterior surface, and circuitry coupled to the multiple electrodes operable to independently store charges at each of the multiple electrodes. Touch of a body to a respective one of the multiple electrodes produces a current by discharging the stored charge.

In various implementations, a portion of the exterior surface around an electrode of the multiple electrodes has a different voltage than the electrode. In some examples of such implementations, the different voltage is a zero voltage.

In numerous implementations, the touch surface is a non-flat surface. In some implementations, the current causes the exterior surface to simulate a texture of a material different from the touch surface. In various implementations, the current is perceptible to the body as a haptic output when the body moves across the touch surface.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
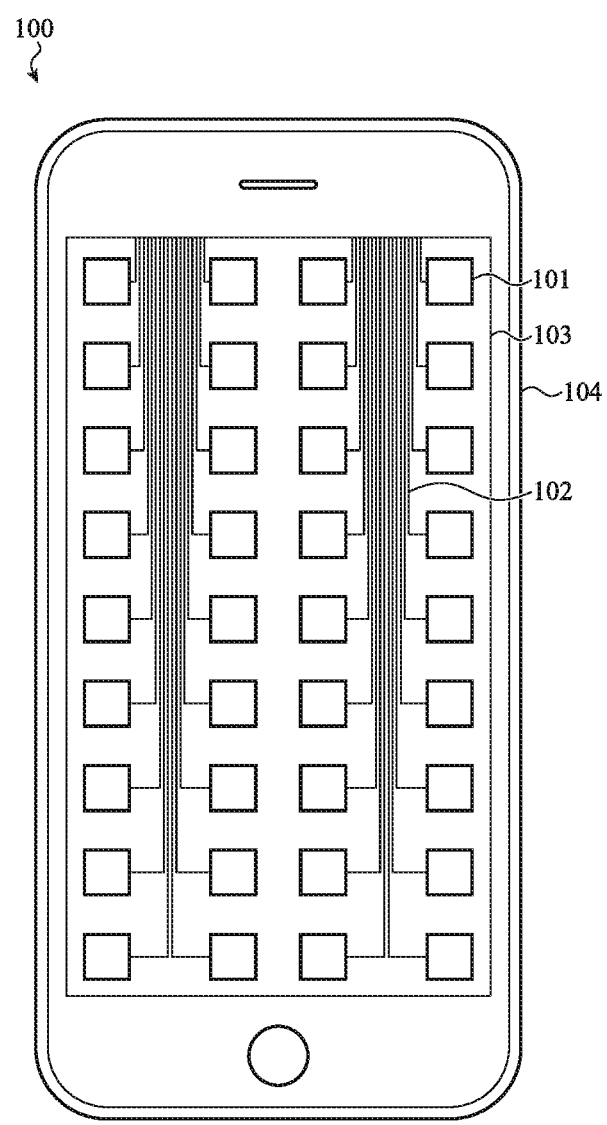
FIG. 1 depicts an electronic device that is operable to provide haptic output.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and apparatuses that embody various elements of the present disclosure. However, it should be understood that the described disclosure may be practiced in a variety of forms in addition to those described herein.

The following disclosure relates to an electronic device that is operable to provide electrical haptic output. Multiple haptic cells may be disposed on a touch surface. Control circuitry may be operable to independently store charges in a capacitor or similar component of each haptic cell. When a user's body touches an exposed electrode of one of the haptic cells, the capacitor may discharge. This creates a current, providing a haptic output. In this way, a wide variety of dynamically configurable haptic outputs can be provided without moving parts and without consuming the space and/or power used for haptic actuators that vibrate and/or otherwise move a mass.

In some implementations, the touch surface may be a haptic touch display. The haptic cells may form a flush surface with the haptic touch display. In such an implementation and/or other implementations, various components of the haptic cells (such as an exposed transparent electrode) may be formed of indium tin oxide and/or other transparent conductive materials (such as fluorine doped tin oxide, doped zinc oxide, and so on) on an exterior surface of the haptic touch display. This may allow the haptic cells to be visually imperceptible to users. By way of another example, anisotropic conductive film may be disposed on the exterior surface of the haptic touch display to connect the haptic cells to the control circuitry and/or other components. In other implementations, the touch surface may be an opaque housing of the electronic device. The touch surface may or may not be configured to receive input from a user. The touch surface may be configured in a variety of flat and/or non-flat shapes.

In various implementations, a frame that forms an exterior of the electronic device is used as a ground for the haptic cells. The electronic device may be configured so that users typically touch the frame when using the electronic device. In this way, the user and the haptic cells could share a ground and/or have the same potential. This may enable the haptic output to be more perceptible to a user.

In numerous implementations, the haptic cells may be individually controlled to provide a variety of different haptic outputs. For example, haptic outputs may be provided in one or more patterns or sequences, based on one or more detected touches and/or touch locations, to simulate materials different than the touch surface (for example, the texture of materials, such as where the current simulates a rougher material than the touch surface when the part of the user's body moves across the touch surface), and so on.

In various implementations, the amount of the current may be controlled so that it is perceptible to a user without causing discomfort. In some implementations, the amount of current may be small enough that it is perceptible to the user when a part of the user's body moves across the touch surface but is not perceptible or is not easily perceptible when the user is touching the touch surface without moving.

In some implementations, haptic cells may be directly adjacent. In other implementations, haptic cells may be separated. Haptic cells may be separated by a surface that has a different voltage than the haptic cells. For example, portions of the touch surface may separate the haptic cells. The portions of the touch surface may have a different voltage than the electrodes, such as a zero voltage.

These and other embodiments are discussed below with reference to FIGS. 1-7. However, those skilled in the art will readily appreciate that the detailed description given herein with respect to these Figures is for explanatory purposes only and should not be construed as limiting.

FIG. 1 depicts an electronic device 100 that is operable to provide haptic output. The electronic device 100 includes a touch surface 103. An array of haptic cells 101 are disposed on an exterior surface of the touch surface 103. The electronic device 100 can independently charge (i.e., store charges at) each of the haptic cells 101. When part of a user's body, such as the user's finger, (see FIG. 3) touches a charged haptic cell 101, the haptic cell provides a haptic output to the user's body by discharging to create a current. The current passes through the user's skin and produces a perceptible sensation (e.g., the haptic output).

For example, each of the haptic cells 101 may include a capacitor. Such a capacitor (which may be coupled, such as in series, with a resistor) may be operable to store charges. When the part of the user's body touches the capacitor, the capacitor may discharge to create the current. By way of example, the haptic cells 101 shown may be an exposed electrode of such a capacitor and other portions of the capacitor (such as another electrode separated from the exposed electrode by a dielectric) may be disposed beneath the exposed electrode.

As illustrated, the touch surface 103 may be a haptic touch display. In such an implementation, the haptic cells 101 and/or portions thereof may be formed of one or more transparent materials so as not to obscure the display. For example, the haptic cells 101 may include one or more transparent electrodes, capacitors, and so on formed of one or more transparent conductive materials such as indium tin oxide, fluorine doped tin oxide, doped zinc oxide, gallium zinc oxide, or the like. In other implementations, the touch surface 103 may be other kinds of surfaces. For example, in some implementations, the touch surface 103 may be an opaque portion of a housing and the electrodes/capacitors need not be transparent. The touch surface 103 may or may not be configured to receive input from a user, such as a touch or force input. In some embodiments, the voltage on each of the haptic cells 101 may be monitored; a drop in voltage may correspond to a touch by a user or other object. This touch may be processed by the electronic device as an input. Put another way, if the haptic cell discharges, the electronic device may process an input in the location of that haptic cell 101.

Figure 3:
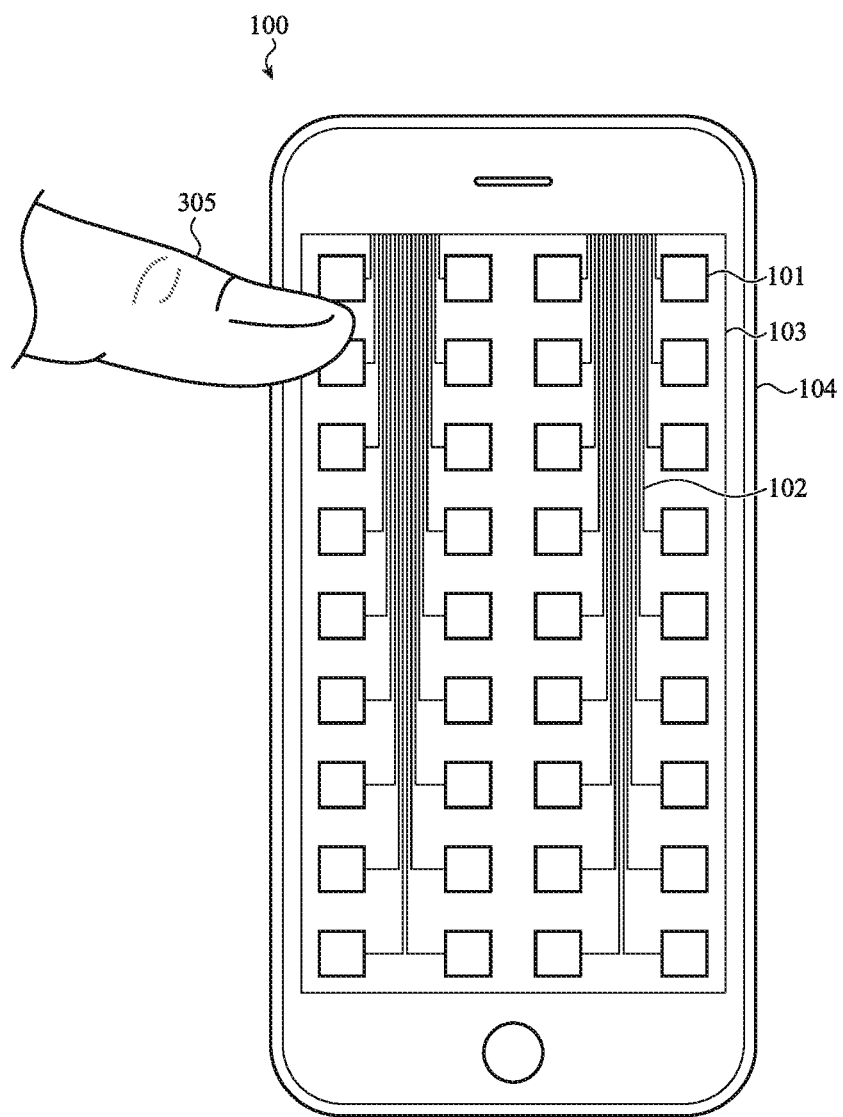
FIG. 3 illustrates a user touching one of the haptic cells of the electronic device of FIG. 1.

Conductive wires 102 or other conductors (such as traces, flexes, and so on) may be disposed on or under the touch surface 103 to electrically connect the haptic cells 101 and/or components thereof to other components of the electronic device 100. For example, in some implementations, the conductive wires may electrically connect the haptic cells 101 to control circuitry (such as one or more switches) that are operative to control charging, discharging, and/or other functions of the haptic cells 101. In other implementations, all or part of such control circuitry may be included in the haptic cells 101 and the conductive wires 102 may electrically connect the haptic cells to other components, such as a power or voltage source, or a readout (such as a processing unit) operative to determine if a haptic cell has been touched (or otherwise monitor a voltage of the cell). These conductive wires 102 may also be formed of transparent conductive materials in some embodiments, and may be translucent or opaque in others. In some implementations, the conductive wires 102 may be anisotropic conductive film disposed on the touch surface 103. It should be appreciated that the routing of the conductive wires 102 shown in FIG. 3 is one example routing; other routing patterns may be used in other embodiments. It should also be appreciated that multiple haptic cells 101 may be multiplexed to a single voltage source and/or readout.

In various implementations, the haptic cells 101, the conductive wires 102, and/or components thereof may include a variety of conductive films. In some implementations, the haptic cells 101, the conductive wires 102, and/or components thereof may be printed and/or otherwise formed on the touch surface 103 using thin-film transistor technology.

In addition to being transparent in various implementations, the haptic cells 101 and/or the conductive wires 102 may be flush with the touch surface 103 or may be positioned within or beneath the touch surface at a depth that still permits the cells to discharge when a finger (or other conductive object) passes over them. In these ways, the haptic cells 101 and/or the conductive wires 102 may be visually and/or otherwise imperceptible to users when not providing haptic output.

The electronic device 100 may also include a frame 104 that forms an exterior of the electronic device 100. The frame 104 may be a conductive material, such as metal, that is used as a ground for the haptic cells 101. The electronic device 100 may be configured so that users typically touch the frame 104 when using the electronic device 100. In this way, the user and the haptic cells 101 may share a ground and/or have the same potential. This may enable the haptic output to be more perceptible to a user. It should be appreciated that the haptic cells 101 may be grounded to some portion of the electronic device other than the frame 104 and need not have a common ground with a user or person holding the device. It may be useful to float the ground of the haptic cells above earth ground, for example, in order to increase the voltage of each cell relative to a user.

In various implementations, the amount of current may be configured based on the haptic output to be produced. Higher amounts of current may be provided for more salient haptic output. The amount of current may be kept below levels that could be uncomfortable for users. In some implementations, the amount of current may be kept sufficiently low that the haptic output is salient when the body of the user moves across a haptic cell 101 (i.e., moves from a region having a positive voltage to one that has a zero voltage, or a voltage low enough not to discharge through skin, and/or where a current is not produced) but not when the body of the user is touching the haptic cell 101 without movement.

Although the electronic device 100 is illustrated as a smart phone, it is understood that this is an example. In various implementations, the electronic device may be any kind of haptic output device or other kind of device without departing from the scope of the present disclosure. Such devices include, but are not limited to, laptop computing devices, desktop computing devices, wearable devices, tablet computing devices, cellular telephones, displays, printers, mobile computing devices, digital media players, keyboards, track pads, and so on.

Figure 2:
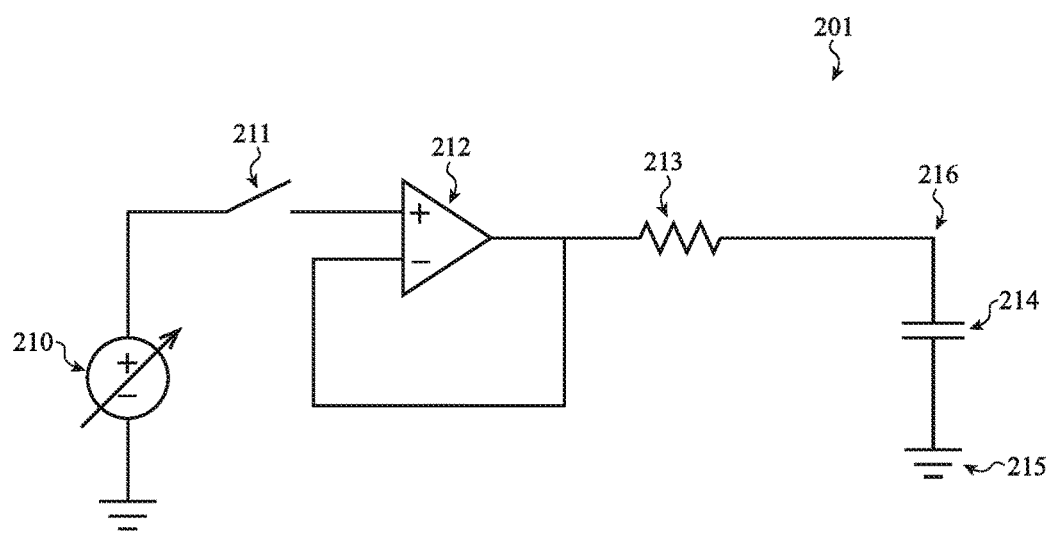
FIG. 2 depicts an example circuit that may be used in the haptic cells of the electronic device of FIG. 1.

FIG. 2 depicts an example circuit 201 that may be used in the haptic cells 101 of the electronic device 100 of FIG. 1. In this example, the circuit 201 includes a capacitor 214. The capacitor 214 is connected to a ground 215. The capacitor 214 is also connected in series to a resistor 213 via a node 216. The resistor 213 is connected to a voltage source 210 (which may be a variable voltage source operable to provide variable voltage) via a switch 211 and an amplifier 212.

The circuit 201 may be operable to store charges in the capacitor 214 (i.e., charge the capacitor 214) by electrically connecting the voltage source 210 to the amplifier 212 by closing the switch 211. When the switch 211 closes and connects the voltage source 210 to the amplifier 212, the resistor 213 causes a current to flow to the capacitor 214 via the node 216. The capacitor 214 then stores a charge unless the capacity of the capacitor is exceeded, in which case the current flows to the ground 215. The switch 211 may then be opened, disconnecting the voltage source 210 from the amplifier 212.

Figure 4:
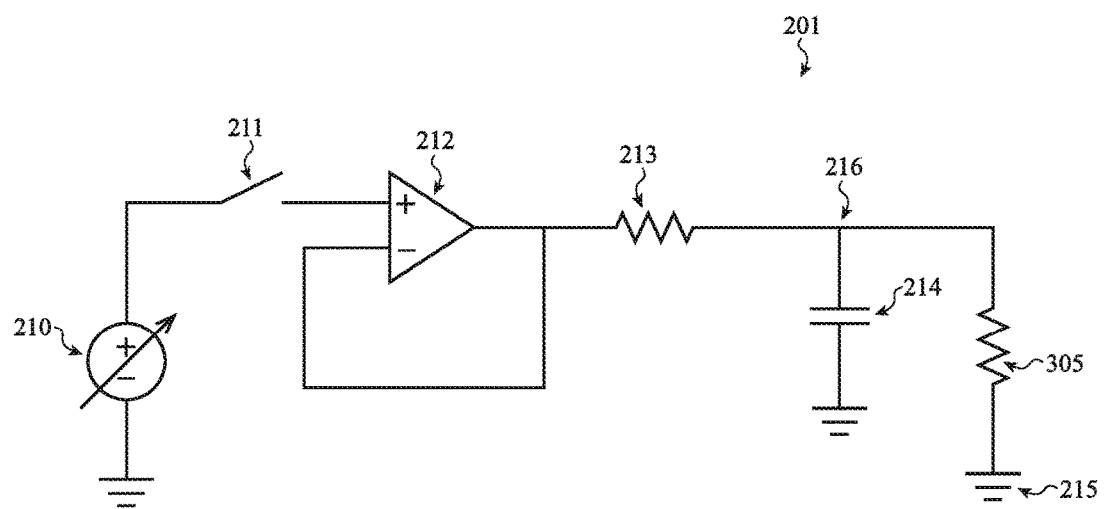
FIG. 4 depicts the example circuit of FIG. 1 when the user is touching the haptic cell illustrated in FIG. 3.

FIG. 3 illustrates a body 305 of a user touching one of the haptic cells 101 of the electronic device 100 of FIG. 1. This would cause the circuit 201 of FIG. 2 to change as illustrated in FIG. 4. The body 305 functions as a resistor connected to the node 216 and the ground 215 (the resistance of the human body may generally be between 1000 and 100,000 Ohms). This discharges the capacitor 214, discharging the charge stored by the capacitor 214 and creating a current that is provided to the body 305. Thus, a haptic output is provided to the user.

The amplifier 212 may function to buffer and/or otherwise at least partially isolate the voltage source 210 from the body 305. This may prevent the voltage source 210 from being affected by the load caused by the body 305 touching the capacitor 214. This may also protect the body 305 from the voltage source 210.

The values of the resistor 213 and the capacitor 214 may be configured such that the haptic output is perceptible when the capacitor 214 is being touched and/or when the body 305 moves across the capacitor 214. The current may be the charge stored by the capacitor 214 divided by the resistance of the body 305. In some implementations, the resistor 213 and the capacitor 214 may be configured such that the current created at discharge of the capacitor 214 is approximately one milliamp.

For example, the voltage source 210 may provide a voltage of approximately 50 volts. The capacitor 214 may have a value of approximately 0.1 microfarad, the resistor 213 may have a resistance of approximately 100,000 Ohms, and the body 305 may have a resistance of approximately 50,000 Ohms. The circuit 201 may charge the capacitor 214 in approximately 60 milliseconds when the capacitor 214 is not touched by the body 305 (charging time being roughly equal to the value of the resistor 213 times the value of the capacitor 214). This may result in a current of approximately one milliamp when the capacitor 214 is touched by the body 305. As a result, a haptic output is provided. The current may drop to approximately 0.3 milliamps within approximately 20 milliseconds (as the current may drop to voltage divided by the resistance of the resistor 213 plus the resistance of the body 305 after the touch, which may be at least less than 50% of the current at touch) and may no longer be perceptible to the user, ending the haptic output.

In some implementations, the circuit 201 may continue to provide haptic output after the capacitor 214 is discharged as long as the body 305 remains touching the capacitor 214. In some examples, this may result in a less salient haptic output than the initial haptic output provided when the capacitor 214 discharged as the voltage provided by the voltage source 210 may not allow creation of the same amount of current as discharge of the capacitor 214. In other implementations, the circuit 201 may not be operable to provide a haptic output after the capacitor 214 is discharged until the body 305 stops touching the capacitor 214 and the capacitor 214 is re-charged by closing the switch 211. For example, the voltage provided by the voltage source 210 may not be sufficient to create an amount of current that is salient as a haptic output when the capacitor 214 is not currently storing a charge. Various configurations are possible and contemplated.

In various implementations, the voltage at the capacitor 214 may be monitored. For example, monitoring circuitry or a processing unit or other mechanism may be connected to the node 216 in order to detect the drop of the voltage stored by the capacitor 214 when touched by the body 305. When the voltage drop is detected, the switch 211 may be closed to re-charge the capacitor 214. In some implementations, touch detection circuitry may be used to first determine that the body 305 is no longer touching the capacitor 214 prior to re-charging the capacitor 214 after the voltage drop is detected.

It is understood that the circuit 201 is provided for the purposes of example. In various implementations, circuits and/or control circuitry may be provided using a variety of different components connected in a variety of different ways without departing from the scope of the present disclosure.

Figure 5:
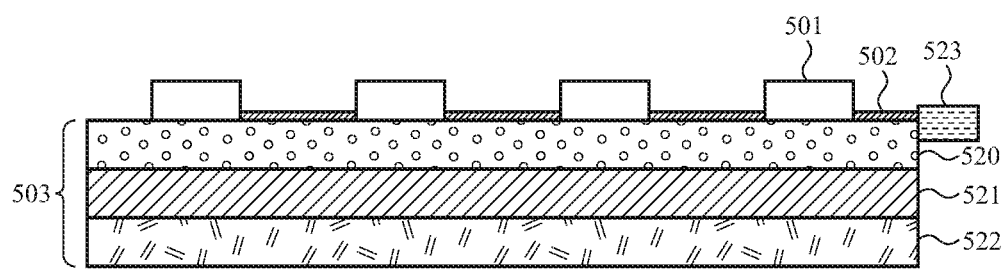
FIG. 5 depicts an example screen stack that may be used in the touch surface of the electronic device of FIG. 1.

As discussed above with respect to FIG. 1, the touch surface 103 of the electronic device 100 may be a haptic touch display. FIG. 5 depicts an example screen stack 503 that may be used in the touch surface 103 of the electronic device of FIG. 1. The screen stack 503 may include haptic cells 501 that include one or more transparent electrodes disposed on an exterior surface of a cover glass 520 or other transparent cover. Transparent conductive wires 502 may also be disposed on the exterior surface of the cover glass 520 that electrically connect the haptic cells 501 to control circuitry 523. A display layer 521 may be coupled to an interior surface of the cover glass 520. The display layer 521 may be a liquid crystal display, and organic liquid crystal display, a light emitting diode display, or any other kind of display. A touch and/or force sensing layer 522 may be coupled to the display layer 521. The touch and/or force sensing layer 522 may be a capacitive sensing layer, a piezoelectric sensing layer, and/or other kind of touch and/or force sensing component.

The transparency of the haptic cells 501, the conductive wires 502, and the cover glass 520 may allow the display layer 521 to be seen without obscuring the display layer 521. The touch and/or force sensing layer 522 may allow for haptic output provided via the haptic cells 501 to be performed in response to various touches on the exterior surface of the cover glass 520. For example, when part of a user's body is determined to be moving across the cover glass 520 toward a particular haptic cell 501, the haptic cell 501 may be charged in order to provide haptic output when the user's body reaches and touches the haptic cell 501.

Although the haptic cells 501 and the conductive wires 502 are shown proud of the cover glass 520, it is understood that this is for the sake of visual clarity. In various implementations, the haptic cells 501 and the conductive wires 502 may be flat and/or otherwise configured so as to be flush with the cover glass 520.

Further, although the screen stack 503 is illustrated and described as including particular components arranged in a particular orientation, it is understood that this is for the purposes of example. In various implementations, various combinations of the same, similar, and/or different components may be arranged in a variety of ways without departing from the scope of the present disclosure. For example, in some examples, the cover glass 520 may be omitted. In various examples, the positions of the display layer 521 and the touch and/or force sensing layer 522 may be reversed. In numerous examples, the display layer 521 and the touch and/or force sensing layer 522 may be combined into a single layer. Various configurations are possible and contemplated.

Figure 6:
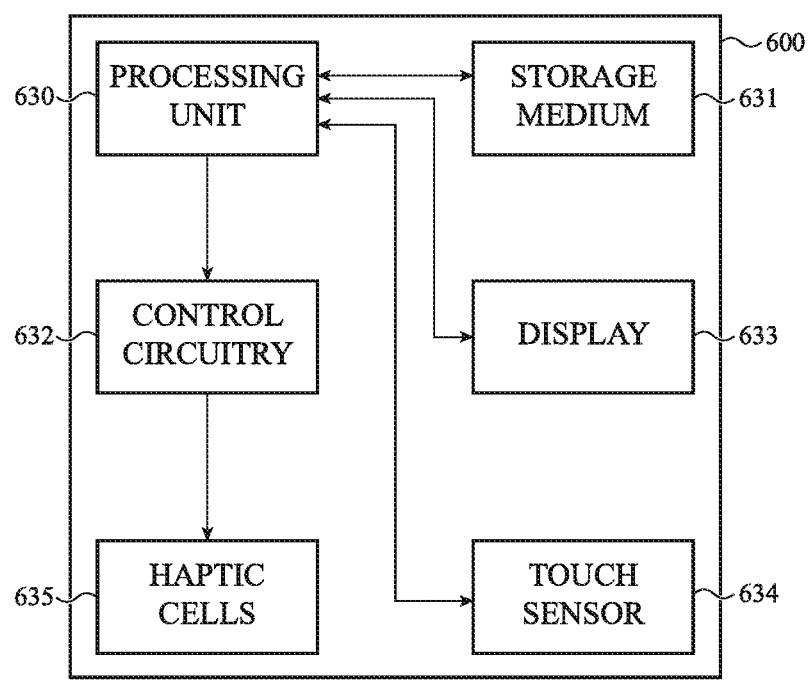
FIG. 6 depicts an example block diagram illustrating the functional relationships between example components that may be used in a haptic output device.

FIG. 6 depicts an example block diagram illustrating the functional relationships between example components that may be used in a haptic output device 600. The haptic output device 600 may be the electronic device 100 of FIG. 1.

The haptic output device 600 may include one or more processing units 630, one or more non-transitory storage media 631 (which may take the form of, but is not limited to, a magnetic storage medium; optical storage medium; magneto-optical storage medium; read only memory; random access memory; erasable programmable memory; flash memory; and so on), one or more sets of control circuitry 632, one or more displays 633, one or more touch and/or force sensors 634, and/or one or more haptic cells 635.

The processing unit 630 may be operable to execute instructions stored in the non-transitory storage medium 631 to perform various haptic output device 600 functions. Such functions may include detecting touch and/or force via the touch and/or force sensor 634, providing output via the display 633, using the control circuitry to charge one or more of the haptic cells 635, using the control circuitry to provide haptic output via one or more of the haptic cells 635, and so on.

Figure 7:
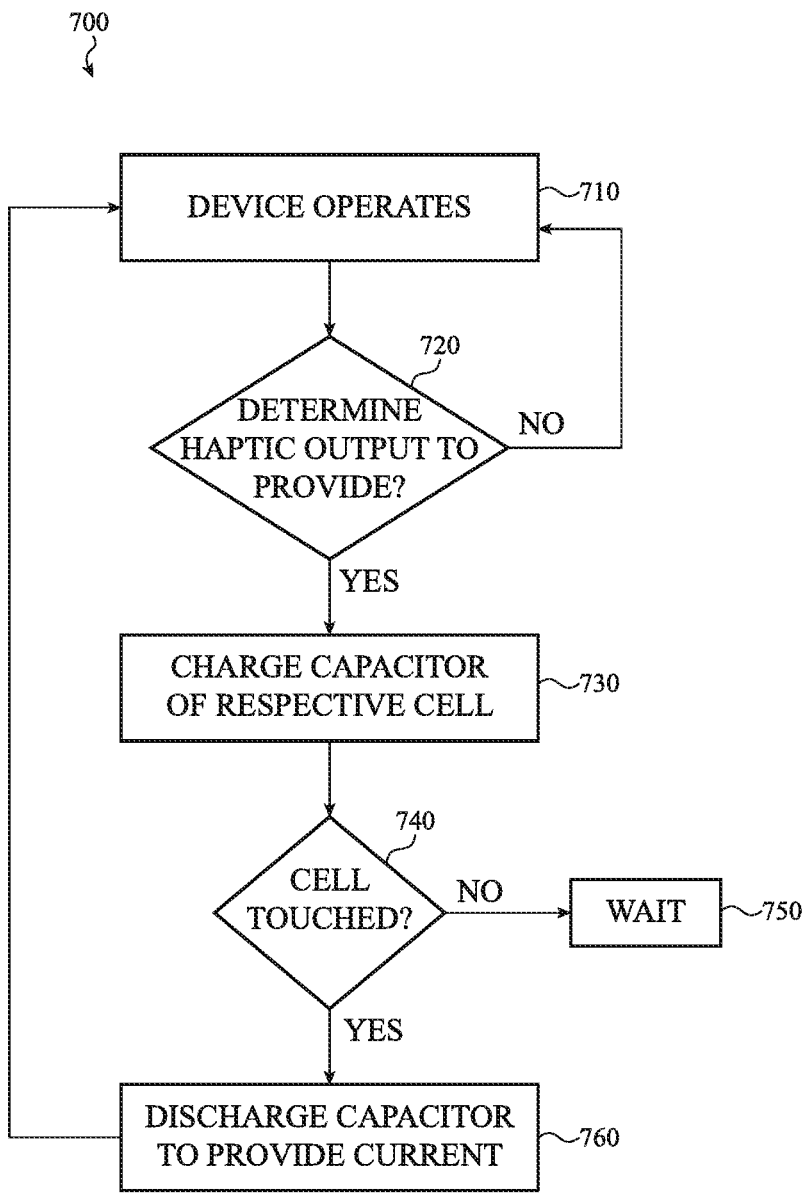
FIG. 7 depicts an example method of providing haptic output.

FIG. 7 depicts an example method 700 of providing haptic output. The method 200 may be performed by the electronic device 100 of FIG. 1 and/or the haptic output device 600 of FIG. 6.

At 710, a device operates. The flow proceeds to 720 where the device determines whether or not to provide one or more haptic outputs. Such a determination may include whether or not to provide haptic output at all, whether or not to currently provide haptic output, whether or not to prepare to provide haptic output, where out of a number of possible locations to provide haptic output, what kind of haptic output to provide and/or prepare for, and so on. If not, the flow returns to 710 and the device continues to operate. Otherwise, the flow proceeds to 730.

At 730, after the device determines to provide haptic output, the device charges one or more capacitors of one or more respective haptic cells that the device determined to use to provide haptic output. The flow then proceeds to 740. At 740, if the respective haptic cell is touched, the flow proceeds to 760 where the capacitor of the respective haptic cell is discharged to provide current, thus providing the haptic output, before the flow returns to 710 and the device continues to operate. Otherwise, the flow proceeds to 750 where the charged respective haptic cell waits to be touched and the flow returns to 740.

Although the example method 700 is illustrated and described as including particular operations performed in a particular order, it is understood that this is an example. In various implementations, various orders of the same, similar, and/or different operations may be performed without departing from the scope of the present disclosure.

For example, the example method 700 is illustrated and described as waiting until the capacitor of the haptic cell is touched after being charged. However, in some implementations, a charged capacitor may stay charged for a period of time rather than indefinitely. As such, the capacitor may be re-charged if not touched within a period of time.

As described above and illustrated in the accompanying figures, the present disclosure relates to an electronic device that is operable to provide electrical haptic output. Multiple haptic cells may be disposed on a touch surface. Control circuitry may be operable to independently store charges in a capacitor or similar component of each haptic cell. When a user's body touches an exposed electrode of one of the haptic cells, the capacitor may discharge. This creates a current, providing a haptic output. In this way, a wide variety of dynamically configurable haptic outputs can be provided without consuming the space and/or power used for haptic actuators that vibrate and/or otherwise move a mass.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A haptic output device, comprising:
   a cover layer having an exterior surface and an interior surface;
   a display layer coupled to the interior surface;
   a touch sensing layer coupled to the display layer;
   multiple capacitors that each include a pair of transparent electrodes disposed on the exterior surface and connected to a voltage source via conductive material that extends across and off of the exterior surface; and
   control circuitry coupled to the multiple capacitors operable to independently charge each of the multiple capacitors using the voltage source;
   wherein a touch of a body on the pair of transparent electrodes of a respective capacitor of one of the multiple capacitors conductively provides a haptic output by discharging the respective capacitor to create a current while the respective capacitor is electrically disconnected from the voltage source.

2. The haptic output device of claim 1, wherein the pair of transparent electrodes comprises indium tin oxide.

3. The haptic output device of claim 1, further comprising transparent conductive wires disposed on or under the cover layer and that connect each of the multiple capacitors to the control circuitry.

4. The haptic output device of claim 1, further comprising a frame that:
   forms a portion of the exterior surface of the haptic output device; and
   functions as a ground for each of the multiple capacitors.

5. The haptic output device of claim 1, wherein the control circuitry is operable to charge at least one of the multiple capacitors based on a detected touch determined by the touch sensing layer.

6. The haptic output device of claim 1, further comprising multiple resistors that each connect the control circuitry to one of the multiple capacitors.

7. The haptic output device of claim 1, further comprising multiple amplifiers that each connect the control circuitry to one of the multiple capacitors.

8. A haptic output device, comprising:
   a touch surface of a display;
   multiple haptic cells that each include a pair of conductive materials disposed on an exterior of the touch surface and connected to a voltage source via a conductor that extends across and off of the exterior of the touch surface; and
   switching circuitry coupled to the multiple haptic cells and the voltage source operable to independently store charge at each of the multiple haptic cells using the voltage source;
   wherein each of the multiple haptic cells is operable to conductively provide a haptic output by discharging the stored charge to create a current when the pair of conductive materials is touched by a body while the pair of conductive materials is disconnected from the voltage source.

9. The haptic output device of claim 8, wherein the multiple haptic cells discharge the stored charge into the body.

10. The haptic output device of claim 8, further comprising anisotropic conductive film disposed on the touch surface that connects the switching circuitry to the multiple haptic cells.

11. The haptic output device of claim 8, wherein each of the multiple haptic cells are operable to have a different voltage level from each other.

12. The haptic output device of claim 8, wherein the touch surface comprises a cover glass.

13. The haptic output device of claim 8, wherein the current simulates a rougher texture than the touch surface when the body moves across the touch surface.

14. The haptic output device of claim 8, wherein a ground connected to the multiple haptic cells and the body has a same potential.

15. A haptic output device, comprising:
   a touch surface having an exterior surface and an interior surface;
   a display positioned under the interior surface of the touch surface;
   multiple pairs of electrodes disposed on the exterior surface and connected to a voltage source via conductive material that extends across and off of the exterior surface; and
   circuitry coupled to the multiple pairs of electrodes operable to independently store charge at each of the multiple pairs of electrodes using the voltage source;
   wherein a touch of a body on a respective one of the multiple pairs of electrodes conductively produces a current by discharging the stored charge while the respective one of the multiple pairs of electrodes is electrically disconnected from the voltage source.

16. The haptic output device of claim 15, wherein a portion of the exterior surface around an electrode of the multiple pairs of electrodes has a different voltage than the electrode.

17. The haptic output device of claim 16, wherein the different voltage is a zero voltage.

18. The haptic output device of claim 15, wherein the touch surface is a transparent cover.

19. The haptic output device of claim 15, wherein the current causes the exterior surface to simulate a texture of a material different from the touch surface.

20. The haptic output device of claim 15, wherein the current is perceptible to the body as a haptic output when the body moves across the touch surface.

* * * * *